United States Patent
Sharifzadeh (10) Patent No.: US 11,691,726 B2
(45) Date of Patent: Jul. 4, 2023

(54) VERTICAL TAKE-OFF AND LANDING AIRCRAFT

(71) Applicant: Darius Sharifzadeh, Camarillo, CA (US)

(72) Inventor: Darius Sharifzadeh, Camarillo, CA (US)

(*) Notice: Subject to any disclaimer, the term of this patent is extended or adjusted under 35 U.S.C. 154(b) by 0 days.

(21) Appl. No.: 17/674,476

(22) Filed: Feb. 17, 2022

(65) Prior Publication Data
US 2022/0169379 A1    Jun. 2, 2022

Related U.S. Application Data

(63) Continuation-in-part of application No. 16/905,336, filed on Jun. 18, 2020, now abandoned.

(60) Provisional application No. 62/863,521, filed on Jun. 19, 2019.

(51) Int. Cl.
*B64C 29/00* (2006.01)
*F02K 1/00* (2006.01)
*B64C 15/12* (2006.01)

(52) U.S. Cl.
CPC .......... *B64C 29/0033* (2013.01); *B64C 15/12* (2013.01); *F02K 1/004* (2013.01)

(58) Field of Classification Search
CPC ..... B64C 29/0033; B64C 39/08; B64C 39/12; B64C 3/32; F02K 1/002
See application file for complete search history.

(56) References Cited

U.S. PATENT DOCUMENTS

| | | | | |
|---|---|---|---|---|
| 2,151,128 A | * | 3/1939 | Looney | B64C 39/08 244/45 R |
| 2,797,547 A | * | 7/1957 | Meulien | B64D 33/04 244/73 R |
| 3,327,480 A | * | 6/1967 | Gunter | F02K 1/002 60/761 |
| 3,388,878 A | | 6/1968 | Peterson et al. | |
| 3,835,643 A | * | 9/1974 | De Garcia, Jr. | F02K 1/002 60/39.43 |
| 3,972,490 A | * | 8/1976 | Zimmermann | B64C 29/0016 244/12.3 |

(Continued)

FOREIGN PATENT DOCUMENTS

| | | |
|---|---|---|
| DE | 102018116146 A1 | 1/2020 |
| DE | 102018116164 A1 | 1/2020 |

*Primary Examiner* — Tye William Abell
(74) *Attorney, Agent, or Firm* — Boudwin Intellectual Property; Daniel Boudwin (57) ABSTRACT

A vertical take-off and landing aircraft is provided. The aircraft comprises a fuselage which has a nose end, a tail end, and a plurality of seats disposed in the interior. A pair of rear wings extend outwardly from opposing sides of the fuselage between a cockpit and the tail end, and a pair of front wings extend outwardly from opposing sides of the fuselage between the cockpit and the nose end. Each of the pair of rear wings and front wings includes an adjustably mounted turbine which comprises a statically mounted fan pod, a duct rotatably connected to the fan pod, and an adjustable nozzle rotatably connected to the duct. The nozzle can be adjusted to a variety of configurations ranging between a vertical position and a horizontal position via the duct. The adjustably mounted turbine enables the aircraft to adjust thrust through vectors ranging between horizontal and vertical.

15 Claims, 8 Drawing Sheets

(56) References Cited

U.S. PATENT DOCUMENTS

| | | | |
|---|---|---|---|
| 4,641,800 A * | 2/1987 | Rutan | B64C 9/12 |
| | | | 244/45 R |
| 4,922,711 A * | 5/1990 | Brown | F02K 1/74 |
| | | | 60/230 |
| 5,115,996 A * | 5/1992 | Moller | B64C 29/0025 |
| | | | D12/326 |
| 5,769,317 A * | 6/1998 | Sokhey | F02K 3/025 |
| | | | 239/265.23 |
| 7,472,863 B2 * | 1/2009 | Pak | B64D 35/04 |
| | | | 244/12.5 |
| 2004/0026563 A1 * | 2/2004 | Moller | B64D 27/06 |
| | | | 244/12.4 |
| 2004/0245374 A1 | 12/2004 | Morgan | |
| 2005/0120702 A1 * | 6/2005 | Fink | F02K 1/004 |
| | | | 60/204 |
| 2006/0022084 A1 | 2/2006 | Magre | |
| 2013/0062455 A1 | 3/2013 | Lugg et al. | |
| 2015/0274289 A1 | 10/2015 | Newman et al. | |
| 2016/0144956 A1 | 5/2016 | Parks | |
| 2020/0009974 A1 | 1/2020 | Bender et al. | |
| 2020/0010209 A1 | 1/2020 | Bender | |
| 2020/0290742 A1 * | 9/2020 | Kumar | B64D 27/24 |

\* cited by examiner

VERTICAL TAKE-OFF AND LANDING AIRCRAFT

CROSS REFERENCE TO RELATED APPLICATIONS

This application claims the benefit of U.S. Non-Provisional application Ser. No. 16/905,336. The above identified patent application is herein incorporated by reference in its entirety to provide continuity of disclosure.

BACKGROUND OF THE INVENTION

The present invention relates to aircraft. More particularly, the present invention provides for an aircraft capable of performing vertical take-off and landing procedures as well as transitioning to a horizontal thrust configuration via adjustable ducts and adjustable nozzles connected to fan pods statically mounted on the wings of the aircraft.

Many people travel great distances utilizing commercial aircraft. Such aircraft allow passengers to bypass traffic on the roads, railways systems, and waterways and allow for a great speed of transport. However, such commercial aircraft are immensely expensive to produce and operate. For example, traditional aircraft require large quantities of fuel to travel the required distances. Traditional aircraft also require runways which are large and long stretches of pavement solely devoted to enabling an aircraft to attain a minimum take-off speed or decelerate from a traveling speed. These aircraft utilize horizontal thrust from their engines and angle themselves to gain or lose altitude. Such procedures necessitate such long runways to enable them to attain the desired speed. Such runways are only available at airports which can only be found in specific locations and are few and far between. Therefore, operation between locations is limited to these pre-existing ports. Airports are typically very busy, thus operations between locations can be very difficult for smaller aircraft. Therefore, a small aircraft that is capable of performing vertical take-off and landing procedures, that can also provide horizontal thrust, thereby eliminating the need for runways, air strips, and devoted airports and the like is desired.

Devices have been disclosed in the known art that relate to aircraft. These include devices that have been patented and disclosed in patent application publications. However, the devices in the known art have several drawbacks. Some aircraft rely on horizontally mounted engines to provide horizontal thrust. These aircraft utilize complex systems of rudders, wings, and flaps to adjust the angle of the entire aircraft to provide slow and gradual vertical displacement in order to gain and lose altitude. Additionally, such aircraft require air to constantly be moving over their wings in order to attain lift. Such aircraft are especially at the mercy of the runway and airstrip system. Helicopters are capable of performing vertical takeoff and landing procedures, but such aircraft are extremely expensive and are harder to fly than planes. Helicopters use their rapidly spinning rotors to create momentum and lift. In order to travel, the entire helicopter must be pitched at an angle to transfer the vertical momentum into forward or rearward momentum.

Some specialized planes have been developed that are capable of limited vertical take-off and landing procedures. However, such aircraft typically use a large number of low-powered rotors spaced around a framework of the fuselage to provide vertical lift. These systems have a short battery life and can typically only provide power for under an hour. Additionally, such complex frameworks and numbers of rotors add to the weight of the vehicle and greatly impact the aerodynamics of the vehicle when not in use. Some other types of specialized planes use a small number of fans incorporated into the fuselage or wings of the craft. These fans can pivot and rotate to a limited degree and offer some vertical momentum but lack the ability to make fine adjustments. These craft also rely on pitching and angling the body of the aircraft in order to attain true freedom of movement in all directions.

The present invention substantially diverges in design elements from the known art and consequently it is clear that there is a need in the art for an improvement to existing aircraft. In this regard the present invention substantially fulfills these needs.

SUMMARY OF THE INVENTION

In view of the foregoing disadvantages inherent in the known types of aircraft now present in the prior art, the present invention provides an aircraft capable of performing vertical take-off and landing procedures as well as transitioning to a horizontal thrust configuration via adjustable ducts and adjustable nozzles connected to fan pods statically mounted on the wings of the aircraft. The present vertical take-off and landing aircraft comprises a fuselage which has a nose end, a tail end, and a plurality of seats disposed in the interior. A pair of rear wings extend outwardly from opposing sides of the fuselage between a cockpit and the tail end, and a pair of front wings extend outwardly from opposing sides of the fuselage between the cockpit and the nose end. Each of the pair of rear wings and front wings includes an adjustably mounted turbine which comprises a statically mounted fan pod, a duct rotatably connected to the fan pod, and an adjustable nozzle rotatably connected to the duct. The nozzle can be adjusted to a variety of configurations ranging between a vertical position and a horizontal position via the duct. The adjustably mounted turbine enables the aircraft to adjust thrust through vectors ranging between horizontal and vertical. In some embodiments, the duct is segmented and includes a bellowed section. In other embodiments, the entire duct is bellowed.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the vertical take-off and landing aircraft. For the purposes of presenting a brief and clear description of the present invention, a preferred embodiment will be discussed as used for the vertical take-off and landing aircraft. The figures are intended for representative purposes only and should not be considered to be limiting in any respect.

Figure 1:
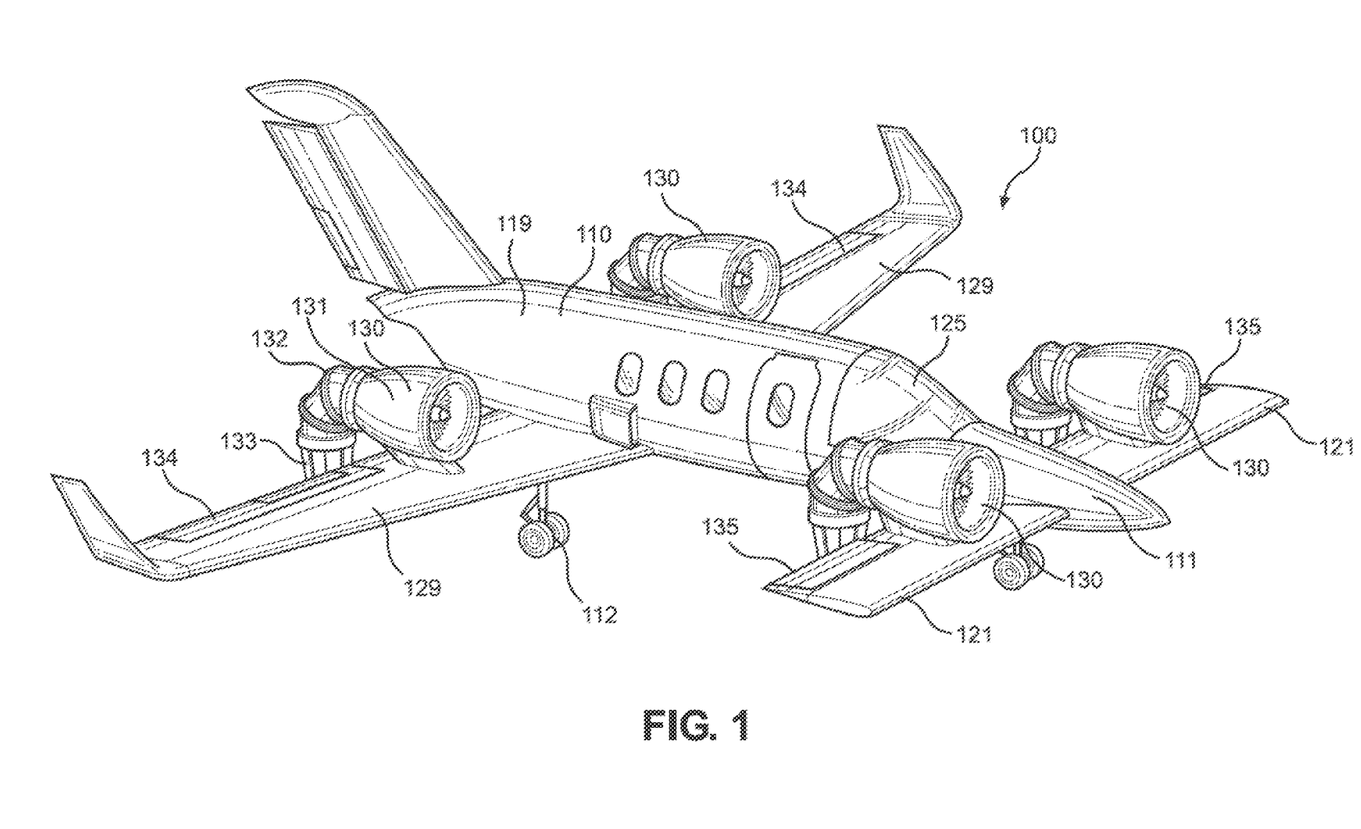
FIG. 1 shows a perspective view of an embodiment of the vertical take-off and landing aircraft.

Referring now to FIG. 1, there is shown a perspective view of an embodiment of the vertical take-off and landing aircraft. The vertical take-off and landing aircraft 100 comprises a fuselage portion 110 including a nose end 111 and a tail end 119. A pair of rear wings 129 extend outwardly from opposing sides of the fuselage 110 between a cockpit 125 and the tail end 119. A pair of front wings 121 extend outwardly from opposing sides of the fuselage 110 between the cockpit 125 and the nose end 111. In one embodiment, the wings 121, 129 are metal with composite material. A machined center section of the fuselage 110 allows the wings 121, 129 to attach thereto.

Each rear wing of the pair of rear wings 129 comprises an aileron 134. Each front wing of the pair of front wings comprises an elevator 135. The pair of ailerons 134 are configured to control the lateral balance of the vertical take-off and landing aircraft 100. The pair of elevators 135 are configured to control the pitch of the vertical take-off and landing aircraft 100. In conjunction, the pair of ailerons 134 and the pair of elevators 135 allow the operator to control the direction of the vertical take-off and landing aircraft 100.

In the shown embodiment, the fuselage 110 is in a canard configuration. One of ordinary skill in the art will understand how a canard configuration differs from other designs and configurations of airplane fuselages. Further, in the shown embodiment, the fuselage 110 is a fixed-wing canard configuration which is inherently stable and structurally rigid in load bearing. In the preferred embodiment, the fuselage 110 comprises metal and composite materials to provide strength, durability, and stability. Further, in the preferred embodiment, the floor is solid aircraft aluminum with machined frames, keels, ribs, brackets, gussets, and the like. In one embodiment, a 3D printed fuselage 110 is attached to an already prepared floor resembling an upside down/inverted "U".

Trailing-link landing gear 112 are disposed on a rear surface of the fuselage 110, such that in the case of a hard landing, the landing gear 112 enables the vertical take-off and landing aircraft 100 to withstand 8 G's of force. The present disclosure is not limited to the type of landing gear utilized and contemplates other types that perform the function of enabling a safe landing.

In the preferred embodiment, the vertical take-off and landing aircraft 100 is operated as Fly-By-The-Wire and is capable of autonomous control. In a further embodiment, the Fly-By-The-Wire system is combined with an autopilot system and mechanical back-up to achieve stable control of the aircraft. It should be understood by one of ordinary skill in the art that such an autonomous control system is able to recover from unusual or unwanted attitude in several ways. As a backup, conventional flight controls are also provided. As a last resort, a button is disposed in the cockpit 125 which automatically and instantaneously reverts controls back to conventional flight controls.

Each of the wings 121, 129 includes an adjustably mounted turbine 130. The adjustably mounted turbine 130 comprises a statically mounted fan pod 131, a duct 132 rotatably connected to the fan pod 131, and an adjustable nozzle 133 rotatably connected to the duct 132. In some embodiments, the adjustably mounted turbine 130 can slide in the fore and aft directions to provide further adjustability, however, in the shown embodiment, the fan pod 131 of the adjustably mounted turbine 130 is permanently affixed to the wing 121, 129. The adjustable nozzle 133 is configured to be adjusted between a vertical position, wherein the output of the adjustable nozzle 133 is perpendicular to the associated wing 121, 129, and a horizontal position, wherein the adjustable nozzle 133 is parallel to the associated wing 121, 129, via the duct 132.

Figure 2:
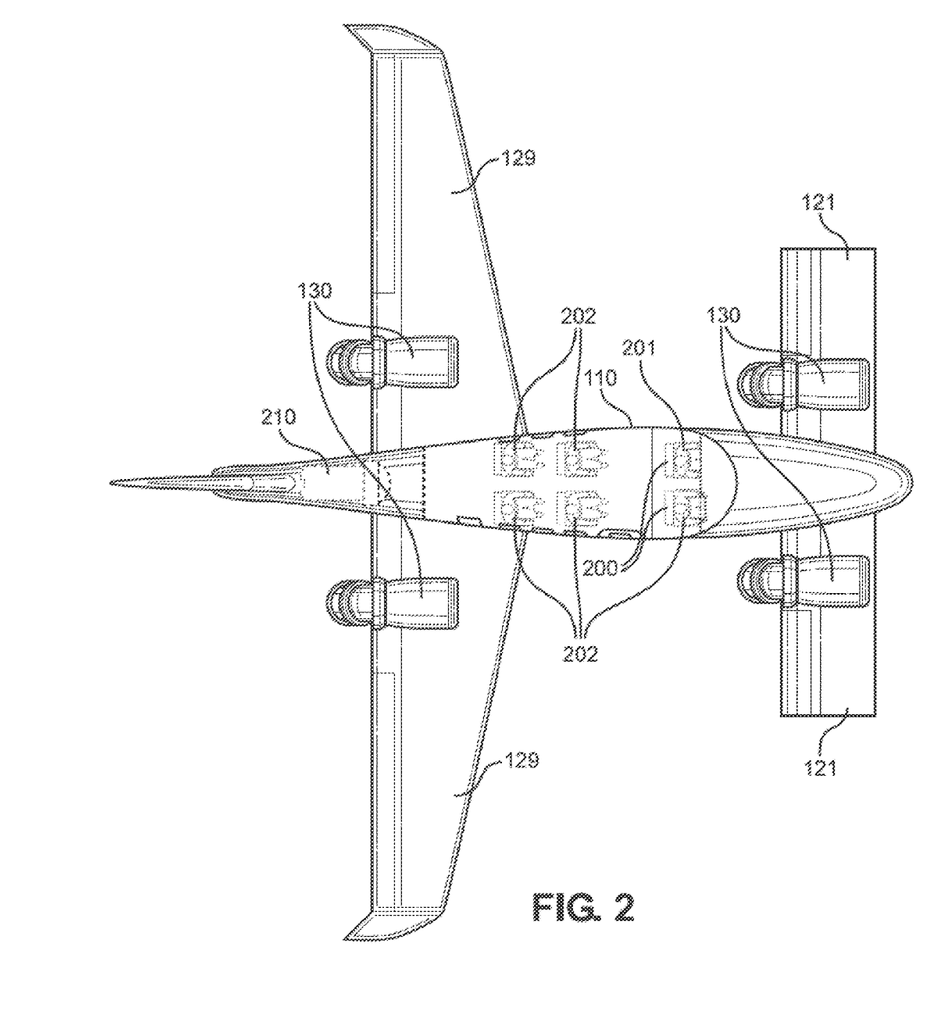
FIG. 2 shows a top-down interior view of an embodiment of the vertical take-off and landing aircraft.

Referring now to FIG. 2, there is shown a top-down interior view of an embodiment of the vertical take-off and landing aircraft. The fuselage 110 comprises a plurality of seats 200 which are configured for passengers 202 to sit in during transport as well as a seat for a pilot 201. One of ordinary skill in the art will understand that the number of seats 200 and design thereof can vary based on the size of the fuselage 110 and the desired comfort of the passenger 202. In the shown embodiment, six seats 200 are disposed in a two-by-two configuration in a rear portion of the fuselage 110 and a two-by-one configuration in a front portion of the fuselage 110. In one embodiment, the pilot 201 seat 200 provides access to controls for the aircraft. In another embodiment, one or both of the two front seats 200 can be utilized to control the vertical take-off and landing aircraft while the remaining seats 200 can be utilized to rest while the aircraft is in use. In one embodiment, the vertical take-off and landing aircraft can maintain a maximum cruise speed of 365 knots and has a range of 1,500 nautical miles.

A single gas-powered turbofan 210 is disposed in a rear portion of the fuselage 110. The gas-powered turbofan 210 provides power for onboard electronics, avionics, air conditioning, lighting, and the like. In one embodiment, the gas-powered turbofan 210 can be used for regenerative charging of at least one associated electric battery pack during multiple phases of flight such as windmilling, taxiing, descent, and the like. In one embodiment, the gas-powered turbofan 210 is a single Williams FJ44-3SP engine disposed in the aft of the fuselage 110. Such an engine can be used as a generator and can charge batteries on the ground and during flight with no auxiliary power unit required. The present disclosure is not limited to the type of gas-powered turbofan 210 utilized, and while the Williams FJ44-3SP is utilized in the preferred embodiment, similar gas-powered turbofans 210 are contemplated by the present disclosure.

In addition to the gas-powered turbofan 210 disposed in the aft of the fuselage 110, adjustably mounted turbines 130 are mounted to the wings 121, 129. In one embodiment, each of the fan pods of the adjustably mounted turbine 130 includes and are powered by two electric motors in tandem, which are shrouded and attached to an electronically controlled vectoring thrust nozzle. The adjustably mounted turbines 130 provide vertical, lateral, and horizontal thrust as further detailed below. The combination of the gas-powered turbofan 210 and the adjustably mounted turbines 130 provide several layers of redundancy in the case of engine failure. For example, if one of the two electric motors in an adjustably mounted turbine 130 fails, the other motor is able to compensate. Similarly, if an entire adjustably mounted turbine 130 fails, the other three adjustably mounted turbines 130 can compensate for the loss. Finally, in the case of failure of the adjustably mounted turbines 130, or in the situations where the adjustably mounted turbines 130 are not utilized, such as when the aircraft is cruising, the gas-powered turbofan 210 is able to produce power and thrust as needed.

Figure 3A:
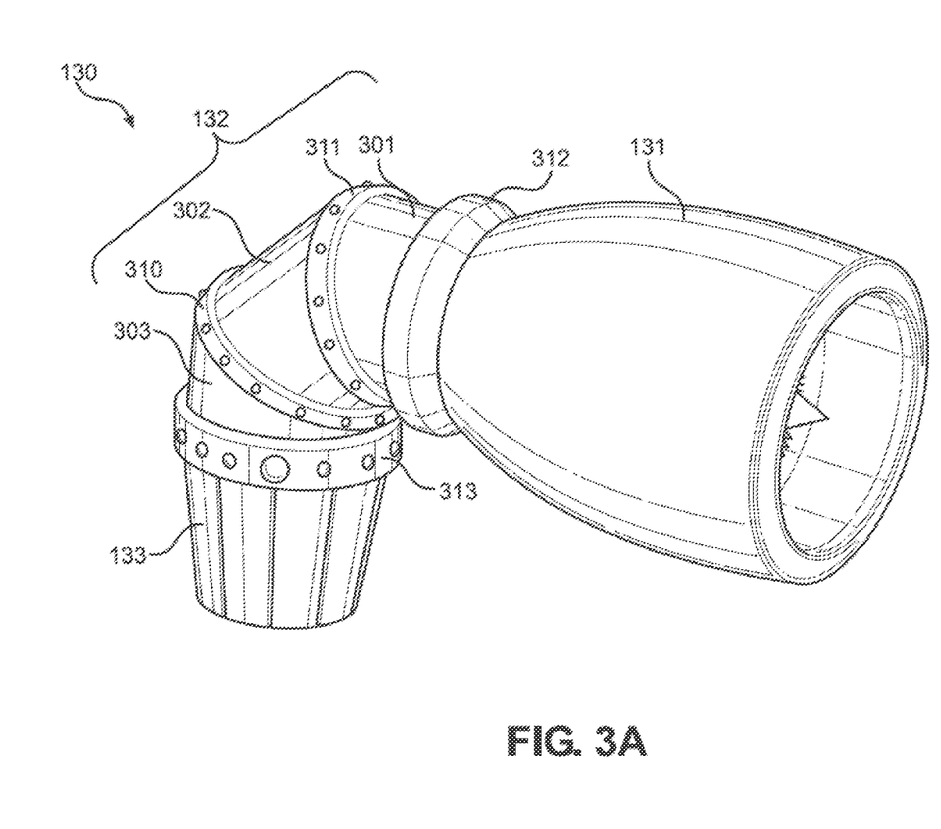
FIG. 3A shows a side perspective view of an adjustably mounted turbine in an embodiment of the vertical take-off and landing aircraft.

Referring now to FIG. 3A, there is shown a side perspective view of an adjustably mounted turbine in an embodiment of the vertical take-off and landing aircraft. In the shown embodiment, the adjustably mounted turbine 130 comprises a statically mounted fan pod 131, a duct 132 rotatably connected to the fan pod 131, and an adjustable nozzle 133 rotatably connected to the duct 132. Thrust is generated by the adjustably mounted turbine 130 by the rapid movement of air through the fan pod 131 into the duct 132 and out of the adjustable nozzle 133. One of ordinary skill in the art will understand how a fan pod 131 and a turbine can be utilized to generate thrust necessary for flight.

The adjustable nozzle 133 is configured to be adjusted between a vertical position, wherein the adjustable nozzle 133 is perpendicular to the associated wing, and a horizontal position, wherein the adjustable nozzle 133 is parallel to the associated wing, via the duct 132. In this manner, the thrust generated by the adjustably mounted turbine 130 can be vectored between a horizontal thrust and a vertical thrust. The horizontal thrust can be utilized in the ordinary manner in concert with the wings to provide lift and flight. The vertical thrust can be utilized to project the aircraft into the air in a vertical manner by projecting the flow of air downwards. Angular thrust can also be attained by moving the adjustably mounted turbine 130 to various configurations between the vertical and horizontal configurations. In some embodiments, lateral thrust can be achieved via the use of a bleed air outlet (as shown in FIG. 3C, 350) powered by a servo, wherein the bleed air outlet is disposed on an outboard side of the adjustable nozzle 133, as further detailed below.

In the shown embodiment, the duct 132 comprises three segments; a front segment 301, a middle segment 302, and a rear segment 303, wherein the front segment 301 is rotatably fastened to the middle segment 302, and the middle segment 302 is rotatably fastened to the rear segment 303. In this manner, the three segments 301, 302, 303 can rotate relative to each other in order to position the duct 132 in a horizontal configuration (as shown in dashed lines in FIG. 4A), a vertical position as shown, and a variety of configurations in between. In the shown embodiment, an electric axle motor is utilized to control the orientations of the segments 301, 302, 303 of the ducts in order to control the orientation of the nozzle 133. The segments 301, 302, 303 are slidably secured to one another via a pair of fasteners 310, 311 Similarly, segment 303 is slidably secured to the nozzle 133 via a nozzle fastener 313 and segment 301 is slidably secured to the fan pod 131 via a fan pod fastener 312.

Figure 3B:
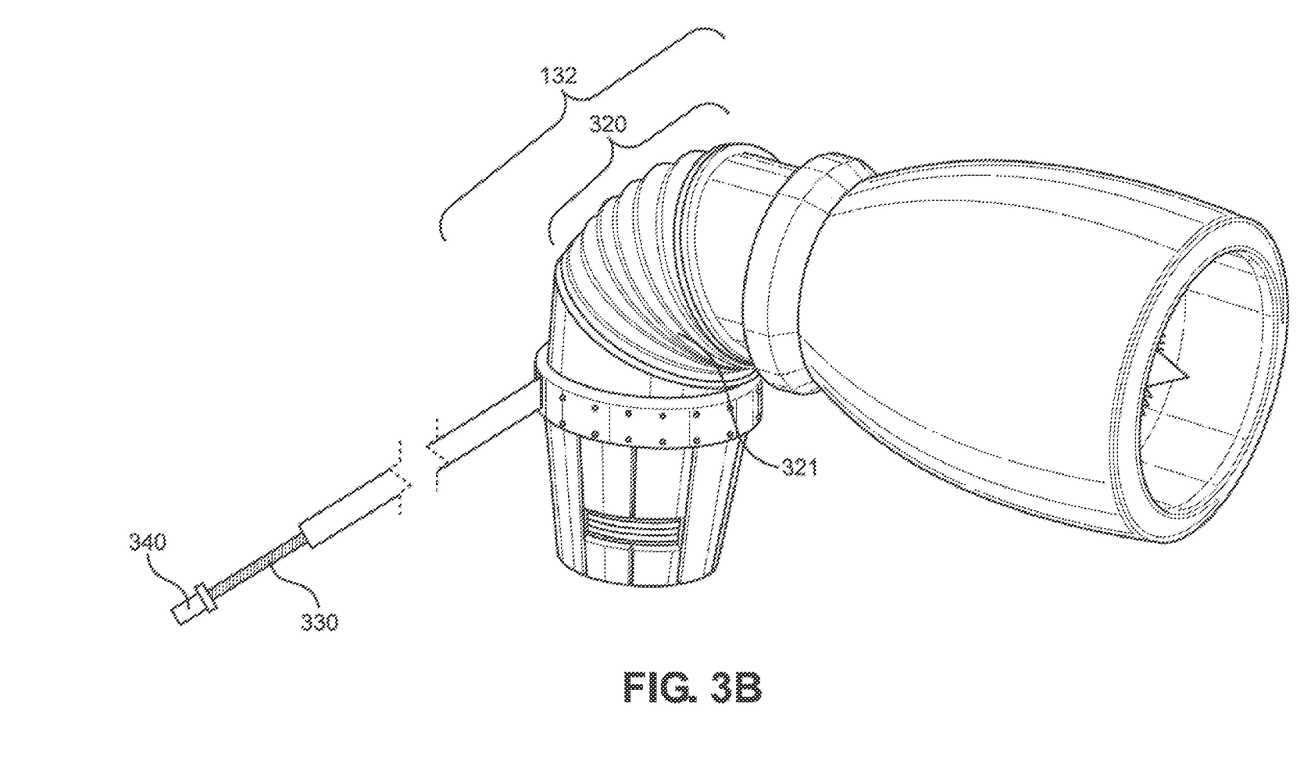
FIG. 3B shows a side perspective view of an adjustably mounted turbine in an alternate embodiment of the vertical take-off and landing aircraft, wherein a portion of a duct of the adjustably mounted turbine includes a bellows.
Figure 3C:
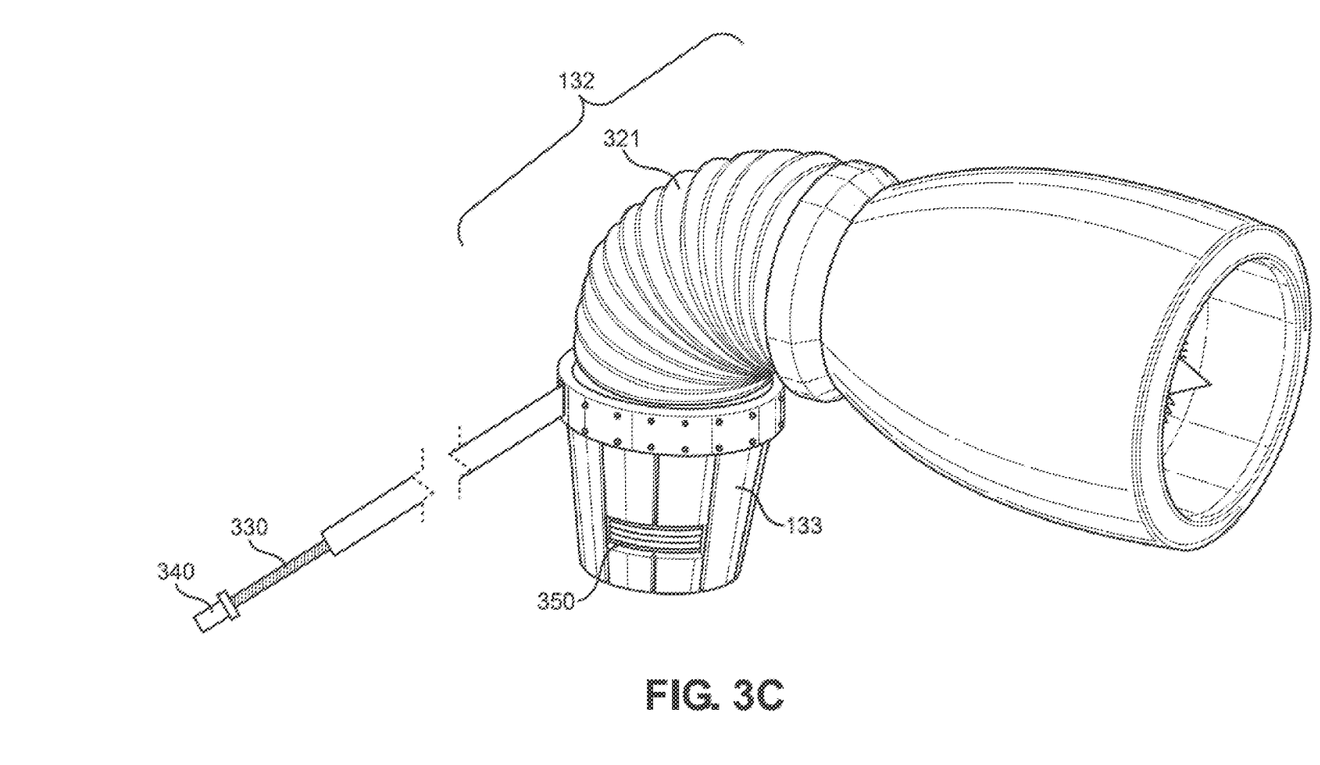
FIG. 3C shows a side perspective view of an adjustably mounted turbine in an alternate embodiment of the vertical take-off and landing aircraft, wherein an entirety of a duct of the adjustably mounted turbine includes a bellows.

Referring now to FIG. 3B, there is shown a side perspective view of an adjustably mounted turbine in an alternate embodiment of the vertical take-off and landing aircraft, wherein a portion of a duct of the adjustably mounted turbine includes a bellows. In one embodiment, a middle portion 320 of the duct 132 comprises a bellows 321. In the shown embodiment, the middle portion 320 is the middle segment identified in FIG. 3A, above. The bellows 321 is configured to compress and expand in an accordion-style manner. The bellows 321 can perform the function of moving the nozzle 133 between a horizontal and vertical configuration, similar to how the axle motor can control the orientations of the segments 301, 302, 303 of the ducts in order to control the orientation of the nozzle 133, as discussed above. The bellows 321 is capable of movement in a vertical axis when forced but can also deflect in a lateral axis to a limited degree. In one embodiment, the bellows 321 is a sewn composite bellowed liner.

The adjustable nozzle 133 is connected to an adjustable turnbuckle 330 and a push rod 340 which is in turn attached to a linear actuator. The linear actuator moves the push rod 340 which in turn moves the adjustable nozzle 133. In this manner, the linear actuator can be utilized to compress and expand the bellows 321 in order to move the adjustable nozzle 133 between a horizontal and vertical configuration.

Referring now to FIG. 3C, there is shown a side perspective view of an adjustably mounted turbine in an alternate embodiment of the vertical take-off and landing aircraft, wherein an entirety of a duct of the adjustably mounted turbine includes a bellows. In the shown embodiment, an entire length of the duct 132 comprises a bellows 321. By providing various configurations of the duct 132 with different portions thereof comprising the bellows 321, different levels of rigidity and flexibility can be attained in the duct 132. For example, in the embodiment shown in FIG. 3A, the duct 132 does not included a bellows 321 and each segment 301, 302, 303 of the duct 132 is rigid and each segment rotates to provide the horizontal and vertical configurations. In contrast, the embodiment shown in FIG. 3B, a portion of the duct 132 includes a bellows 321 which provides for greater flexibility and movement profiles while maintained the rigid characteristics of the front segment 301 and the rear segment 302. Finally, in the shown embodiment, the entire length of the duct 132 comprises a bellows 321 thereby providing the greatest amount of flexibility to the duct 132. By utilization of the linear actuator to move the push rod 340 and the adjustable turnbuckle 330, the entire length of the duct 132 can be expanded, compressed, or moved to any configuration allowed by the function of the bellows 321.

In the shown embodiment (as well as the embodiment shown in FIG. 3B) the adjustable nozzle 133 further comprises a bleed air outlet 350 disposed on an outboard side of the adjustable nozzle 133. The bleed air outlet 350 is powered by its own servo and is used to augment lateral stability. In another use, the bleed air outlet 350 can be utilized as a damper. One of ordinary skill in the art will understand how directing a portion of the flow of air through the bleed air outlet 350 will provide additional lateral stability. The additional lateral stability is desirable in situations such as precision pinpoint landings on a roof top in heavy cross winds and low visibility.

Figure 4A:
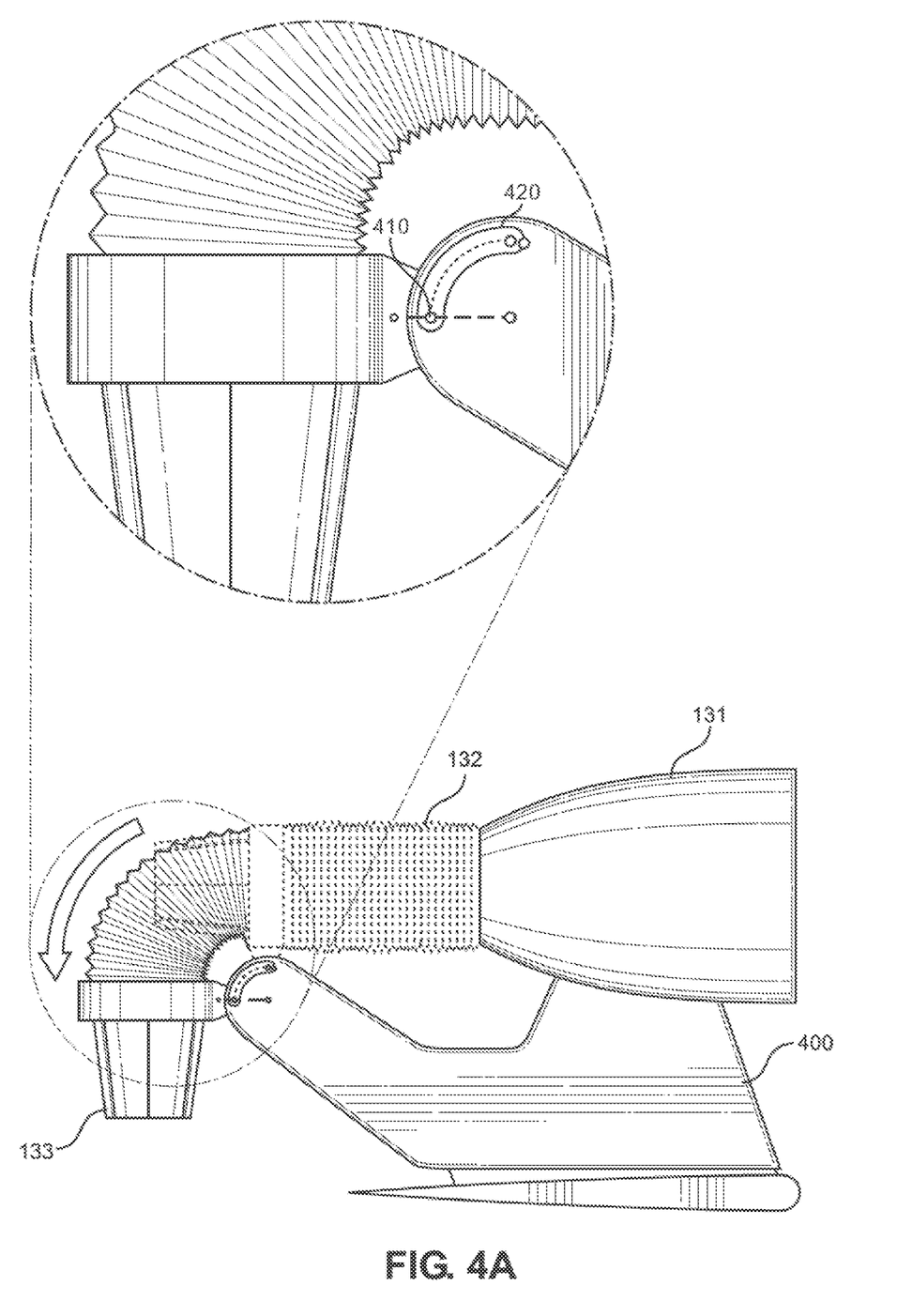
FIG. 4A shows a perspective view of an adjustably mounted turbine in an embodiment of the vertical take-off and landing aircraft with a focus on an over-the-wing mounting bracket.

Referring now to FIG. 4A, there is shown a perspective view of an adjustably mounted turbine in an embodiment of the vertical take-off and landing aircraft with a focus on an over-the-wing mounting bracket. In the shown embodiment, each of the fan pods 131 is permanently and statically mounted to the wing via a mounting bracket 400. Further, in the shown embodiment, the mounting bracket 400 is mounted to a top surface of the wing. The mounting bracket 400 assures that the fan pod 131 is statically disposed on the wing. In this manner, the aerodynamics of the wing are not constantly changing as the fan pod 131 moves from one position to another. Some other devices present in the art provide for fan pods 131 that are integrated into the wing or fuselage. These fan pods 131 rotate within their housings and affect the aerodynamic characteristics of the wing. In some instances, the rotation of the fan pod 131 in their housing creates a large amount of drag and in other cases creates a cross-current of airflow around the wing. The present invention eliminates this drag and cross-current of airflow by directing the flow of air from the fan pod 131 through the duct 132 and out the nozzle 133, wherein the nozzle is disposed behind the wing on which the fan pod 131 and mounting bracket 400 are attached. By vectoring the airflow behind the wing, the aerodynamic properties of the wing are unaffected by the airflow through the adjustably mounted turbine.

In one embodiment, the nozzle 133 is slidably mounted to the mounting bracket 400. In a further embodiment, the nozzle 133 travels along a channel 420 in the mounting bracket 400. In the shown embodiment, the channel 420 is semicircular in order to enable the nozzle 133 to move between a horizontal and vertical configuration. The channel 420 is disposed on a rear portion of the mounting bracket 400 such that the distance between a point of connection between mounting bracket 400 and the nozzle 133 is minimized. The channel 400 is also disposed on a portion of the mounting bracket 400 that is beyond and behind the wing in order to maintain the aerodynamic properties of the wing and prevent interference of the motion of the nozzle 133 by colliding with the wing. In the shown embodiment, the duct 132 is entirely a bellows 321, and movement of the linear actuator 410 between extreme ends of the channel 420 fully compresses and fully extends the bellows 321 and duct 132.

Figure 4B:
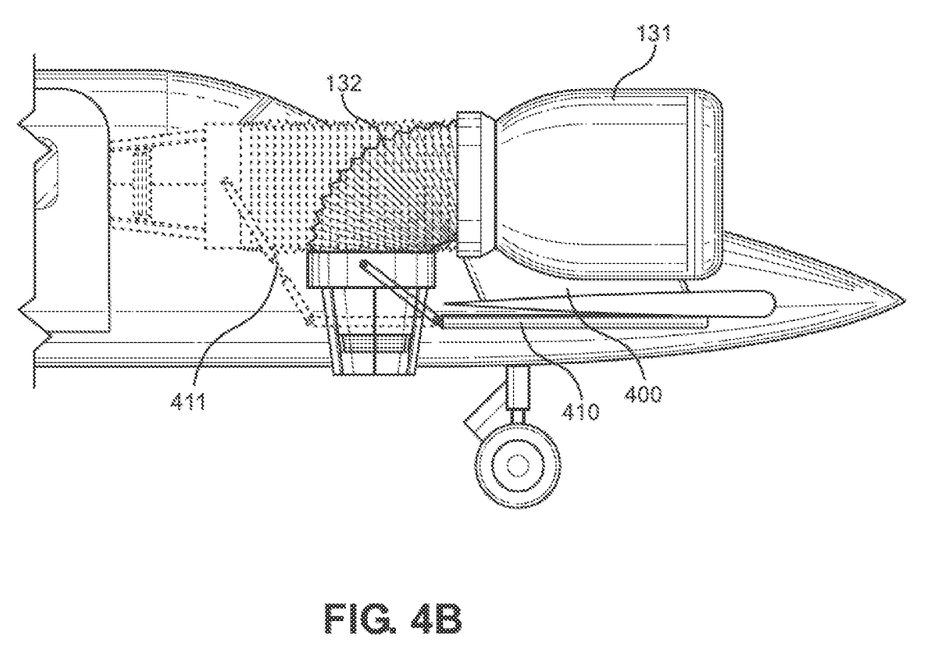
FIG. 4B shows a perspective view of an adjustably mounted turbine in an alternate embodiment of the vertical take-off and landing aircraft with an under-the-wing linear actuator.

Referring now to FIG. 4B, there is shown a perspective view of an adjustably mounted turbine in an alternate embodiment of the vertical take-off and landing aircraft with a focus on an under-the-wing linear actuator. In the shown embodiment, the fan pod 131 is permanently and statically mounted to the wing via the mounting bracket 400. Unlike the embodiment shown in FIG. 4A, in the shown embodiment the mounting bracket 400 does not comprise a portion that extends beyond and behind the wing and does not include a channel. Instead, in the shown embodiment, the linear actuator 410 is mounted below the wing. The linear actuator 410 is connected to an exterior surface of the nozzle 133. In this manner, when the linear actuator 410 moves back and forth, the connected nozzle 133 moves with it. In the shown embodiment, the linear actuator 410 comprises a telescopic portion 411. The telescopic portion 411 enables a length of the linear actuator 410 to be shorter when the duct 132 is in the vertical position, and the length of the linear actuator 410 to be longer when the duct 132 is in the horizontal position. In the show embodiment, the duct 132 is entirely a bellows and the linear actuator 410 enables the bellows to compress, expand, and move from a vertical to a horizontal configuration. In other embodiments, the duct 132 includes a partial bellows (as shown in FIG. 3B) and comprises three static segments (as shown in FIG. 3A). In such embodiments, the linear actuator 410 provides a backup to the motor which allows such segments to rotate relative to each other. Thus, the presence and use of the linear actuator 410 provides a redundancy such that in the event that the motor fails, the linear actuator 410 can be used to rotate the segments between a horizontal and vertical configuration.

Figure 4C:
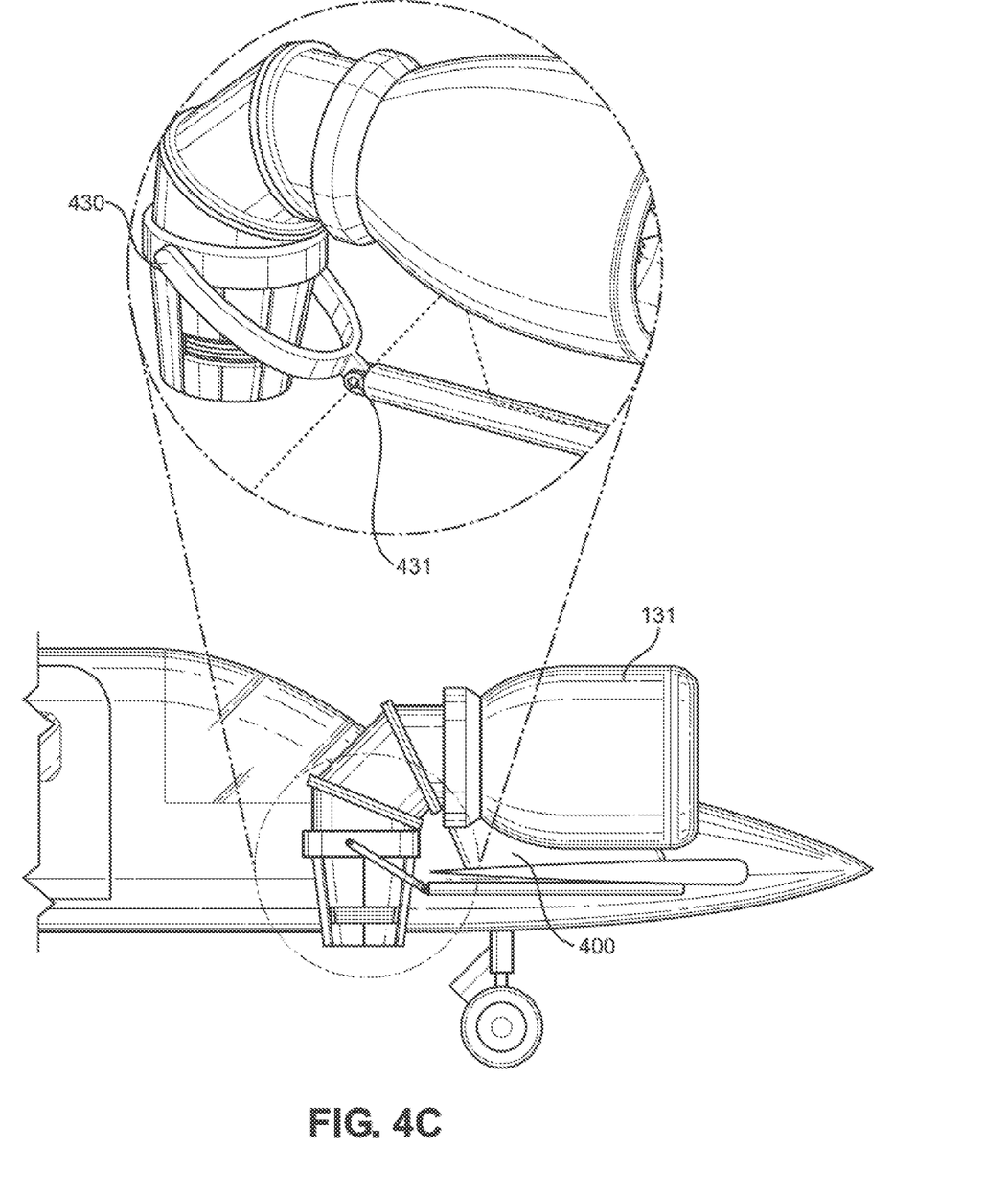
FIG. 4C shows a side view of an adjustably mounted turbine in an alternate embodiment of the vertical take-off and landing aircraft with a focus on a wishbone-shaped actuator.

Referring now to FIG. 4C, there is shown a side view of an adjustably mounted turbine in an alternate embodiment of the vertical take-off and landing aircraft with a focus on a wishbone-shaped actuator. Similar to the embodiment shown in FIG. 4B, in the shown embodiment the fan pod 131 is permanently and statically mounted to the mounting bracket 400, the mounting bracket 400 is in turn mounted to a top surface of the wing. The mounting bracket 400 does not comprise a portion that extends beyond and behind the wing and does not include a channel. Instead, in the shown embodiment, the linear actuator 410 is mounted below the wing. In the shown embodiment, the linear actuator 410 is connected to an exterior surface of the nozzle 133 via a wishbone-shaped telescopic actuator 430. In the shown embodiment, the wishbone-shaped telescopic actuator 430 comprises a linear actuator 410 hingedly connected to a semi-circular attachment member. The semi-circular attachment member enables the wishbone-shaped telescopic actuator 430 to attach to opposing external surfaces of the nozzle 133. Further, as the linear actuator 410 is hingedly connected to the semi-circular attachment member in the wishbone-shaped telescopic actuator 430 the semicircular attachment member can rotate as needed when the linear actuator 410 moves. A depth of curvature of the semicircular attachment member is large enough such that when the wishbone-shaped telescopic actuator 430 rotates to a position below the nozzle 133, the nozzle 133 does not impede the movement of the wishbone-shaped telescopic actuator 430. Thus, the wishbone-shaped telescopic actuator 430 can freely rotate about and below the nozzle 133.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vertical take-off and landing aircraft, comprising:
a fuselage including a nose end and a tail end;
the fuselage comprising a plurality of seats disposed in an interior volume of the fuselage;
the fuselage further comprising a cockpit disposed at a front end of the interior volume of the fuselage;
a pair of rear wings extending outwardly from opposing sides of the fuselage between the cockpit and the tail end;
each rear wing of the pair of rear wings comprising an aileron;

a pair of front wings extending outwardly from opposing sides of the fuselage between the cockpit and the nose end;
each front wing of the pair of front wings comprising an elevator;
wherein each of the pair of rear wings and each of the pair of front wings includes an adjustably mounted turbine;
wherein each adjustable mounted turbine is disposed on a top surface of each of the pairs of rear wings and each of the pair of front wings;
the adjustably mounted turbine comprising a statically mounted fan pod, a duct rotatably connected to the fan pod, and an adjustable nozzle rotatably connected to the duct;
wherein the duct is rotatable between at least a horizontal configuration, a vertical position, and a plurality of intermediate positions;
wherein the horizontal configuration is defined where the adjustable nozzle is parallel to the associated wing and horizontal thrust is generated;
wherein the vertical position is defined where the adjustable nozzle is perpendicular to the associated wing and vertical thrust is generated;
wherein the statically mounted fan pods are defined entirely above a corresponding wing.

2. The vertical take-off and landing aircraft of claim 1, wherein each of the statically mounted fan pods are permanently mounted to a top surface of the wing via a mounting bracket, wherein the mounting bracket defines a gap between the statically mounted fan pod and the wing.

3. The vertical take-off and landing aircraft of claim 1, wherein the duct comprises a front segment, a middle segment, and a rear segment, wherein the front segment is rotatably fastened to the middle segment, and the middle segment is in turn rotatably fastened to the rear segment.

4. The vertical take-off and landing aircraft of claim 1, wherein the adjustable nozzle is connected to a wishbone-shaped telescopic actuator.

5. The vertical take-off and landing aircraft of claim 1, wherein the adjustable nozzle further comprises a bleed air outlet powered by a servo, wherein the bleed air outlet is disposed on an outboard side of the adjustable nozzle.

6. The vertical take-off and landing aircraft of claim 1, wherein each of the statically mounted fan pods are powered by two electric motors in tandem.

7. The vertical take-off and landing aircraft of claim 1, wherein the fuselage is in a canard configuration.

8. The vertical take-off and landing aircraft of claim 1, wherein the adjustable nozzle is connected to an adjustable turnbuckle and a push rod attached to a linear actuator, wherein the linear actuator is configured to move the adjustable nozzle between the horizontal configuration and the vertical position.

9. The vertical take-off and landing aircraft of claim 8, wherein the adjustable nozzle is slidably mounted to the mounting bracket.

10. The vertical take-off and landing aircraft of claim 9, wherein the adjustable nozzle is slidable via movement of the linear actuator along a channel defined within the mounting bracket.

11. A vertical take-off and landing aircraft, comprising:
a fuselage including a nose end and a tail end;
the fuselage comprising a plurality of seats disposed in an interior volume of the fuselage;
the fuselage further comprising a cockpit disposed at a front end of the interior volume of the fuselage;
a pair of rear wings extending outwardly from opposing sides of the fuselage between the cockpit and the tail end;
each rear wing of the pair of rear wings comprising an aileron;
a pair of front wings extending outwardly from opposing sides of the fuselage between the cockpit and the nose end;
each front wing of the pair of front wings comprising an elevator;
wherein each of the pair of rear wings and each of the pair of front wings includes an adjustably mounted turbine;
wherein each adjustable mounted turbine is disposed on a top surface of each of the pairs of rear wings and each of the pair of front wings;
the adjustably mounted turbine comprising a statically mounted fan pod, a duct rotatably connected to the fan pod, and an adjustable nozzle rotatably connected to the duct;
wherein the duct comprises a front segment, a middle segment, and a rear segment, wherein the front segment is rotatably fastened to the middle segment, and the middle segment is in turn rotatably fastened to the rear segment;
wherein the duct is rotatable between at least a horizontal configuration, a vertical position, and a plurality of intermediate positions;
wherein the horizontal configuration is defined where the adjustable nozzle is parallel to the associated wing and horizontal thrust is generated;
wherein the vertical position is defined where the adjustable nozzle is perpendicular to the associated wing and vertical thrust is generated;
wherein the statically mounted fan pods are defined entirely above a corresponding wing;
wherein each of the statically mounted fan pods are permanently mounted to a top surface of the wing via a mounting bracket, wherein the mounting bracket defines a gap between the statically mounted fan pod and the wing.

12. The vertical take-off and landing aircraft of claim 11, wherein the adjustable nozzle is connected to a wishbone-shaped telescopic actuator.

13. The vertical take-off and landing aircraft of claim 11, wherein the adjustable nozzle is connected to an adjustable turnbuckle and a push rod attached to a linear actuator, wherein the linear actuator is configured to move the adjustable nozzle between the horizontal configuration and the vertical position.

14. The vertical take-off and landing aircraft of claim 13, wherein the adjustable nozzle further comprises a bleed air outlet powered by a servo, wherein the bleed air outlet is disposed on an outboard side of the adjustable nozzle.

15. A vertical take-off and landing aircraft, comprising:
a fuselage including a nose end and a tail end;
the fuselage comprising a plurality of seats disposed in an interior volume of the fuselage;
the fuselage further comprising a cockpit disposed at a front end of the interior volume of the fuselage;
a pair of rear wings extending outwardly from opposing sides of the fuselage between the cockpit and the tail end;
each rear wing of the pair of rear wings comprising an aileron;
a pair of front wings extending outwardly from opposing sides of the fuselage between the cockpit and the nose end;

each front wing of the pair of front wings comprising an elevator;
wherein each of the pair of rear wings and each of the pair of front wings includes an adjustably mounted turbine;
wherein each adjustable mounted turbine is disposed on a top surface of each of the pairs of rear wings and each of the pair of front wings;
the adjustably mounted turbine comprising a statically mounted fan pod, a duct rotatably connected to the fan pod, and an adjustable nozzle rotatably connected to the duct;
wherein the duct is rotatable between at least a horizontal configuration, a vertical position, and a plurality of intermediate positions;
wherein the horizontal configuration is defined where the adjustable nozzle is parallel to the associated wing and horizontal thrust is generated;
wherein the vertical position is defined where the adjustable nozzle is perpendicular to the associated wing and vertical thrust is generated;
wherein the statically mounted fan pods are defined entirely above a corresponding wing;
wherein the adjustable nozzle is connected to an adjustable turnbuckle and a push rod attached to a linear actuator;
a gas-powered turbofan disposed in the rear portion of the fuselage, the gas-powered turbofan configured to power onboard electronic devices.

\* \* \* \* \*